UNITED STATES PATENT OFFICE.

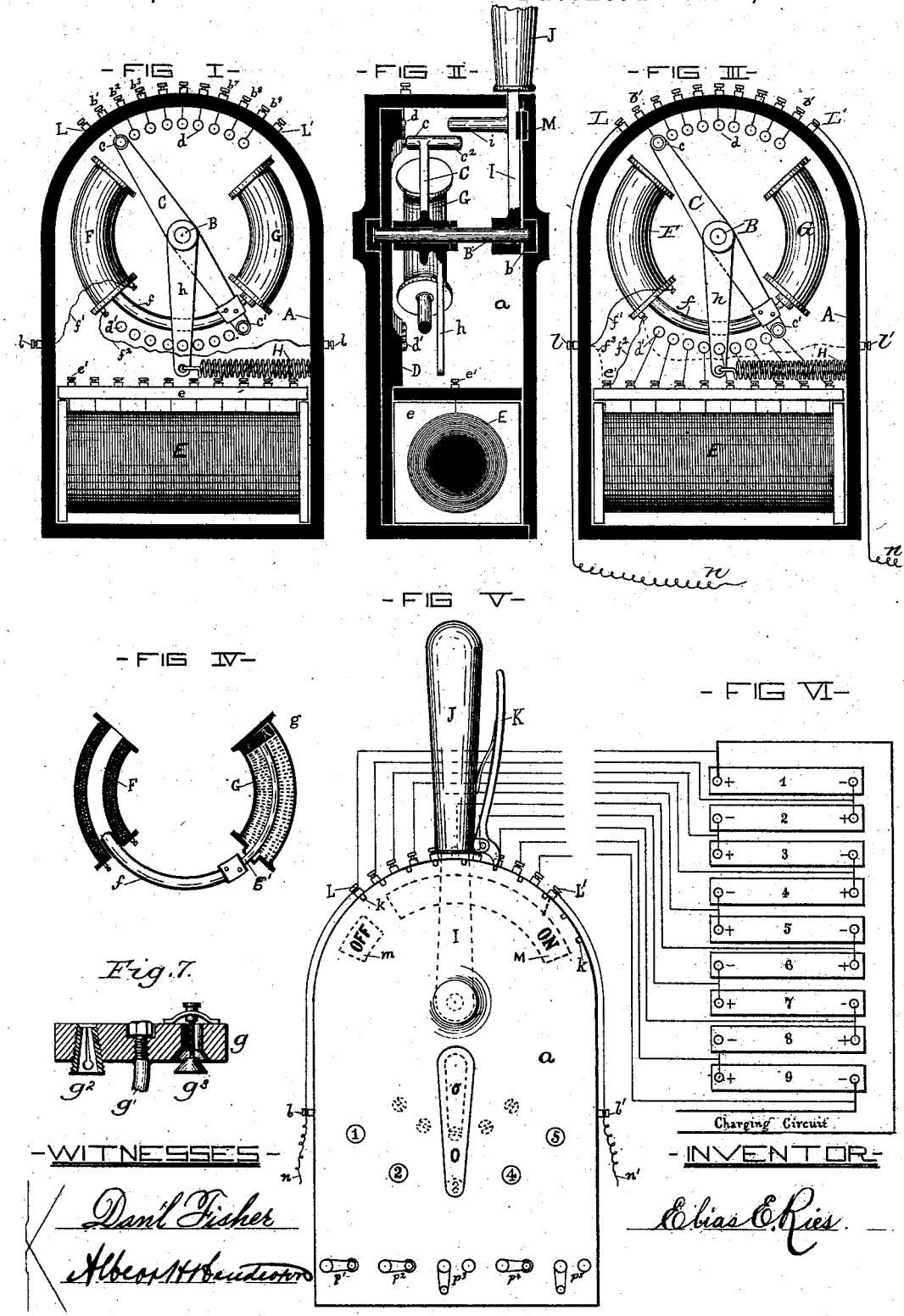

ELIAS E. RIES, OF BALTIMORE, MD., ASSIGNOR, BY DIRECT AND MESNE ASSIGNMENTS, TO EDWARD O. PUNCHARD, OF BOSTON, MASS.

CIRCUIT-CLOSING APPARATUS FOR ELECTRIC BRAKES AND OTHER DEVICES.

SPECIFICATION forming part of Letters Patent No. 356,963, dated February 1, 1887.

Application filed November 4, 1885. Serial No. 181,807. (No model.)

*To all whom it may concern:*

Be it known that I, ELIAS E. RIES, of Baltimore, in the State of Maryland, have invented certain new and useful Improvements in Circuit-Closing Apparatus for Electric Brake and other Circuits, of which the following is a specification, reference being had to the accompanying drawings, forming a part thereof.

This invention relates to certain improvements in circuit-closing apparatus, whereby the actuating-current to the brake or other devices is applied gradually and with continuously-increasing strength, so as not to subject said devices to the rapid wear and tear due to the sudden strain upon them when, as has heretofore been customary in operating such apparatus, the entire strength of the current is applied at once.

It further relates to certain improvements, whereby the amount of current supplied to the brake or other devices can be regulated and controlled at will, so that the operation of such devices and the extent to which they are applied is at all times under perfect control.

The general object of this invention is to afford a simple, practical, and efficient means for automatically controlling the supply of current from a secondary battery, dynamo-electric machine, or other source of electricity to one or more translating devices in such a manner that said devices and the mechanism connected with and operated thereby are protected from sudden shocks or strains when the circuit leading to such devices is closed.

It further has for its object the more perfect and efficient application of the whole or any desired portion of the entire available current to such devices, for the purpose of better governing and controlling their operation and preventing any excess or waste of power.

The invention is especially intended for use in such cases where the translating devices require currents of high potential, and from the nature of their service demand more or less frequent applications of the current—such, for example, as in the case of electric or electro-magnetic brakes, electric elevators, electric motors, and other electrical machinery.

The invention is equally applicable, with slight modifications, to other purposes, some of which will hereafter form the subject of separate applications for Letters Patent.

The general construction and operation of the apparatus will be readily understood by referring to the drawings, in which—

Figure I is a sectional elevation of the inclosing-case of the regulating and governing apparatus, giving a general view of the interior and showing the connections when it is intended to be used to regulate the current from a primary or a secondary battery. Fig. II is a sectional end elevation of the same with the cover and switch-lever in place. Fig. III is a view similar to Fig. I, except that this view shows the interior connections when it is intended to regulate the current transmitted to a derived working-circuit from a main working-circuit, or to transmit the direct current from a suitable generator to one or more translating devices that require a gradual application of the current. Fig. IV is a detail sectional view of the automatic regulating and governing devices. Fig. V is a front elevation of the apparatus, showing the switch-lever and the arrangement of circuits when used in connection with the cells of a secondary battery. Fig. VI is a diagram view of a secondary battery, illustrating the method in which the cells are connected to the binding-posts leading to the upper row of contacts of the apparatus. Fig. VII is an enlarged sectional view of the dash-pot piston and its openings.

Similar letters of reference indicate corresponding parts.

Referring to the drawings, A is an inclosing-case containing the circuit-closing mechanism. This case is provided with a cover or door, *a*, and may either be made of cast-iron, or, if desired, of insulating material—such, for instance, as hard rubber. A shaft, B, is supported in insulated bearings *b b*, fixed in the front and back of the case, respectively, and loosely mounted on this shaft is a contact-lever, C, having contact-surfaces *c c'*, one at each extremity of the lever. These contact-surfaces are adapted to make electrical contact with two independent series of contacts, *d d'*, placed, respectively, in the paths of the contact-surfaces *c* and *c'*. The contacts *d d'* are secured to a plate, D, of insulating material, or are fixed directly to the rear wall of the inclosing-case, if the latter is formed of non-conducting material, as before stated. The upper series of contacts connect, respectively, with a corresponding number of binding-posts, $b'\ b^2\ b^3$, &c., arranged along the curved top of the case A, and these in turn are connected with a secondary battery in the manner hereinafter explained.

In order that the apparatus may also be used to modify and control the flow of current produced by one or more dynamo-electric machines or other generators of electricity, it is provided with a removable frame, $e$, containing a series of resistance-coils, E, so arranged as to be readily connected to the lower series of contacts, $d'$, as shown in Fig. III.

It will of course be understood that, instead of the resistance-coils E, any other suitable resistance—such as carbon or other substance—may be employed when currents of large quantity or of high electro-motive force are to be used.

Suitably secured to the interior of the case A is a curved solenoid or helix, F, whose soft-iron core $f$ is firmly fixed to the contact-lever C at or near its lower extremity, and is curved to correspond with the shape of the interior of the solenoid, as shown in the sectional view, Fig. IV. Directly opposite the solenoid is a dash-pot, G, whose function is to regulate the motion and prevent the too rapid entrance of the core $f$ into the solenoid when the latter is energized. To this end the dash-pot is provided with a piston, $g$, having two valves or openings therein of different size and opening in opposite directions, as shown at $g^2$ and $g^3$, Fig. VII. The interior of the dash-pot cylinder is filled with a suitable liquid—such as glycerine—and when the piston $g$ is drawn out by the action of the solenoid the liquid escapes through the smaller opening, $g^2$, into the rear of the cylinder. The opening in this valve can be regulated by an adjustable tapering set-screw, as shown, and as the space of time in which the solenoid can draw the piston to the other end of the dash-pot is determined by the size of the opening in the piston, and consequently by the length of time required by the liquid to pass from one side of the piston to the other, it will be seen that the motion of the lever C over the series of contacts $d$ and $d'$ is not only very regular, but the time occupied by it in doing so can be accurately adjusted by regulating the size of the opening in the piston. When the current passing through the solenoid is interrupted, the contact-lever and the various parts connected therewith are restored to their normal position, as shown in Figs. I and III, by the action of the spiral spring H, the liquid in the dash-pot in this case passing through the larger valve.

Although the dash-pot cylinder is shown curved, in order to better harmonize with the form of the inclosing-case it is clear that any other form of cylinder may be used, or other substitute—such as air—employed therein without departing from the spirit of this feature of the invention.

Near the front end of the shaft B is pivoted a switch-lever, I, having a handle, J, of non-conducting material, and a sector-pawl or ratchet-lever, K, designed to enter notches $k$, placed at intervals along the arc formed by the top of the case A. A projecting arm, $i$, extends backward from the lever I, and, being in the path of a similar projection, $c^2$, on the contact-lever C, (see Fig. II,) serves to limit the forward motion of the latter in such a manner that when acted upon by the solenoid it cannot move over a greater number of contacts than those determined by the position of the handle J. The contact-lever C is in electrical connection with the switch-lever I through the shaft B.

Referring to Figs. V and VI, it will be seen that the cells of the secondary battery, represented by the figures 1 2 3 4 5 6 7 8 9, and 9 which are connected in series with each other, are consecutively connected with the binding-posts $b'\ b^2\ b^3$, &c., the wire from the + pole of the first cell being connected with the binding-posts L and $l$ at the left of the apparatus and being continued from the latter to the translating devices, the current to which it is desired to regulate. The wire from the other side of the translating devices is brought back to the binding-posts $l'$ and L', the latter connecting with a segment or curved contact-plate, M, with which the switch-lever I makes connection when it is moved to the right of the instrument from a similar but smaller contact-plate, $m$, at the left, and upon which the lever I rests when the circuit through the instrument is open. The solenoid F in the present instance is connected with the binding-posts $l$ and $l'$, as shown in Fig. I, and is therefore in multiple arc with the circuit-wires.

Now, if it is desired to send the current from the secondary battery to the translating devices in circuit with the regulating apparatus, the operation is as follows: The contact-lever C being in its normal position over the first contact-point of the series of contacts $d$, as shown in Fig. I, if the circuit from the battery be now closed by moving the switch-lever I from the normal position over the plate-contact $m$, at the left, to a point on the curved contact-plate M—say to the extreme right of the apparatus—a current will flow from the + pole of the first cell to the binding-post $l$, where it divides, the larger portion going to the translating devices through the wire $n$ and returning to the binding-post $l'$ by means of the wire $n'$, and the smaller portion going through the solenoid F, the proportion of the current traversing the solenoid being determined by its resistance compared to that of the translating devices. The returning current from the wire $n'$ goes to the binding-post L', to the curved plate M, to the switch-lever I, through the shaft B to the contact-lever C, through the first contact-point and binding-post $b'$ to the — pole of cell 1 of the secondary battery. It will thus be seen that at the moment of closing the circuit only one cell of the battery is included therein. The solenoid F, however, being now energized to a certain degree by the current passing through it, now begins to attract the core $f$ and moves the contact-lever to the second contact-point, thus throwing two cells into the circuit and increasing its own force. This process continues, each additional cell thrown into the circuit also increasing the force with which the core $f$ is drawn into the solenoid; but as the core cannot enter the solenoid faster than the gradually-diminishing quantity of liquid in the lower portion of the dash-pot will permit, the motion of the contact-lever over the series of contact-points is rendered uniform and additional cells are thrown into the circuit with perfect regularity until the entire battery is in the circuit. If, however, it is not desired to send the entire strength of the battery to the translating devices, it is only necessary to move the switch-lever I to any intermediate point along the arc formed by the top of the case, the lever being held in position by the pawl K, as in Fig. V. The operation will then be same as before, except that when the lever C has moved forward sufficiently it will come in contact with the projecting arm or stop $i$ on the lever I, and the solenoid thereby prevented from moving it farther. In this manner the current transmitted to the translating devices can be accurately and efficiently controlled.

It is evident that instead of connecting the accumulators in the manner shown in Fig. VI, in which they are shown as being both charged and discharged in series, they may be arranged in any other manner desired, so as to better adapt them to the particular work for which they are designed, and the connections with the current-transmitting or circuit-closing apparatus can be so made as to enable them to be used for a number of other purposes. It will also be noticed that the apparatus is equally well adapted to control the admission of the current from a primary battery, the cells or elements of which may be connected with the binding-posts $b'$ $b^2$ $b^3$, &c., either in series, in multiple series, in multiple arc, or in any other desirable manner, the operation of the apparatus being precisely the same as when secondary batteries are employed. When, however, a comparatively weak current is to be employed, whether from primary or secondary batteries or from any other source, I prefer that the solenoid F be placed in the direct circuit, or in series with the translating or other devices.

I will now explain how the apparatus is employed to transmit the current produced by one or more dynamo-electric or other generators placed at a distance from it, so as to adapt the current to the requirements of the class of translating devices under consideration.

It will be readily understood that while a current produced from a suitable local source of energy—such as a battery composed of a number of individual elements or groups of elements, or from one or more dynamo-electric machines—can be easily controlled in the first case by gradually increasing or diminishing the number of elements or groups of elements, as already explained, and in the second case by similarly increasing or diminishing the resistance of or the amount of current flowing through the field-magnet circuit or otherwise. When, however, the source of electric energy is located at a distance from the translating devices and the circuit-closing apparatus—such, for example, as when the current is supplied from a generating-station to a moving car or motor on a railway-line, or from a central station to one or more sub-stations or consumers at a distance by means of a derived circuit from a main line of conductors—it will be necessary to place more or less artificial resistance in the derived circuit, or in a secondary circuit from such derived circuit, as the case may be, to diminish or increase the amount of current to the translating devices. This I accomplish in the following manner:

As has heretofore been stated, the case A is provided with a series of resistance-coils, E, and a lower series of contact-points, $d'$, to which the several coils are connected, as in Fig. III. In the organization shown in this figure, the solenoid F is connected by means of the wire $f'$ with the binding-post $l$, as before, while the wire $f^2$ connects with the first binding-post, $e'$, of the resistance E. The solenoid is thus placed in "series" with the resistance-coils and with the circuit in which the translating devices are placed. In some instances, however—such as when a current of comparatively high electro-motive force or potential is to be used in this circuit—I prefer to connect the solenoid in "shunt" or "derived" circuit therewith, so that only a small proportion of the total current strength will pass through the solenoid. In this case the wire $f^2$, leading from the solenoid, is connected with the binding-post $l'$ at the right of the instrument, while the first binding-post, $e'$, of the resistance is connected with the binding-post $l$ at the left, as shown in dotted lines, the wire $f'$ remaining as before. Thus it will be seen that when the terminal wires $n$ and $n'$ of the exterior circuit containing the translating devices are connected, respectively, with the binding-posts $l$ and $l'$, and the circuit is closed by moving the switch or circuit-closing lever I to any desired point on the plate M, the main portion of the current entering by way of the wire $n'$ will flow from the post $l'$ to the upper post, $L'$, to the curved plate M, through the switch-lever I, through the shaft B, down the lower arm of the lever C to the contact-surface $c'$, through the resistance-coils E, and out by the post $l$ and wire $n$ to the translating devices, while a portion of the current is diverted and flows from the post $l'$ to the post $l$, via the solenoid F, which is energized thereby to move the contact-lever C over the lower series of contacts, d'.

As it is not ordinarily intended to use both upper and lower series of contacts at the same time, no special insulation is necessary to electrically separate the contact-surfaces c and c' from each other, for the reason that when the battery is employed the resistance-coil is either not connected, as in Fig. I, or the circuit of which it forms a part is opened by means of a convenient switch or cut-out arranged therein for this purpose, and vice versa.

It will be seen that while the contact-surface c traverses the upper series of contacts from left to right, the opposite extremity of the contact-lever passes over the contacts d' from right to left, its normal position (when the circuit is open) being at the right. This arrangement is employed to obviate the necessity of changing or reversing the line-wire or circuit-connections when for any reason it is desired to employ the instrument occasionally in both of its capacities—that is to say, in regulating the application of the current by throwing in additional cells of battery on the one hand and by throwing out or diminishing the resistance of the circuit on the other hand. This arrangement of a right and left hand contact in connection with a pivoted contact-lever adapts the instrument to the requirements of both methods of transmission without changing the movement of the operative parts, the operation of the instrument when the resistance-coils are used in regulating the amount of current flowing to the translating devices being such that at the moment of closing the circuit by means of the switch-lever I all of the resistance-coils are included, so that only a weak current at first enters the solenoid and the translating devices, this current being gradually increased as one coil after another is thrown out of the circuit by the movement of the contact-lever over the lower series of contacts until only the last coil is in circuit, or until the sweep of the contact-lever is brought to a stop by the switch-lever I.

It will be seen from the foregoing that the instrument is not limited in its operation to particular classes of current, nor is it limited in scope to certain forms of work. As an illustration of the latter, it is not only adapted to regulate the amount of current and its gradual application to "translating" devices designed to produce mechanical work—such as electro-magnets, solenoids, electro-dynamic motors, &c.—but it is equally well adapted and intended to be employed in connection with other forms of service—such, for instance, as electric lighting, more particularly incandescent lighting—in order to prevent the premature wear or decay of the incandescent filaments, due to the sudden manner in which the current is usually turned on and off, as well as to regulate the intensity of the light in a simple, practical, and convenient manner.

From what has already been said it will be understood that by means of the circuit-closing apparatus the strength of current flowing to the translating devices is capable of being diminished as well as increased. For example, if, after having turned on the full current by moving the handle J to the point marked "on," it be desired to diminish the current strength to any desired extent, or even to stop its flow altogether, all that is necessary is to move the handle J in the reverse direction any desired distance toward the point marked "off." This movement of the handle J carries the contact-lever C with it, which, by retracing its path over the series of contacts, diminishes the amount of current flowing through the solenoid and the translating devices until, upon the handle being moved to the last-named point, the circuit is finally opened. Although the lever C is in this case moved back by hand, its motion is rendered uniform by the action of the dash-pot cylinder, which, in the manner before described, controls and regulates the speed with which it can be moved.

When the apparatus is designed to regulate the admission of the current to a number of independent circuits, it is provided with a supplemental switch-lever, O, (shown in Fig. V,) connecting with a similar interior lever, o, that is adapted to move over a number of double contacts, (representing the terminals of their respective circuits,) shown in dotted lines and corresponding with figures or reference-numbers, as 1 2 3 4 5, marked upon the outside of the case. When the supplemental lever is moved to any particular number, the circuit corresponding with such number is closed by the interior lever, o, and the instrument is operated to control that particular current when the circuit is completed by moving the switch-lever I in the manner before described. The arrangements of circuits employed are not shown in this figure, in order not to complicate the drawings; but they do not materially differ from other well-known connections of a similar nature, and are readily understood by persons skilled in the art to which this invention appertains. The wires belonging to the several circuits are preferably led to binding-posts suitably secured to the inclosing-case, and the exterior circuits, if they are to be otherwise employed, can be kept closed by means of suitable switches, such as $p'\, p^2\, p^3\, p^4\, p^5$, when the regulating apparatus is not required to be in circuit therewith.

Having thus described my invention, what I claim is—

1. The combination, with the cells or elements of a primary or secondary battery and a normally-open working-circuit in connection with one or more cells of said battery, of a current-transmitting or circuit-closing apparatus placed in said circuit, and provided with an actuating-solenoid and a suitable speed regulating or timing device, and designed and adapted when the working-circuit is closed to automatically and uniformly increase the current strength by throwing additional cells or elements into the said circuit, substantially as set forth.

2. The combination, with the cells or elements of a primary or secondary battery and a working-circuit containing one or more translating devices designed and adapted to receive current from said battery, of a circuit-closing apparatus having a series of contact-surfaces in electrical connection with individual elements or groups of elements of said battery, a contact-lever adapted to make electrical contact with said contact-surfaces, and actuating mechanism, substantially such as described, and consisting of a solenoid and a suitable retarding or speed-regulating device, whereby when the circuit to such translating device or devices is closed the apparatus will be operated to successively and uniformly throw additional elements or groups of elements into the working-circuit, substantially as set forth.

3. The combination, with the cells or elements of a primary or secondary battery and a normally-open working-circuit containing one or more translating devices designed to be operated by said battery, of a current-transmitting or circuit-closing apparatus having a series of contact-surfaces in electrical connection with the individual cells of said battery, a movable contact arm or lever normally in position over the first contact-surface, but designed to be operated to come into successive contact with all of said surfaces, and a circuit-closing lever arranged and adapted to close the circuit to the translating devices and to limit the motion of the contact arm or lever, substantially as and for the purpose specified.

4. An electric-current transmitting or circuit-closing apparatus provided with a primary lever for closing an electric circuit, a secondary lever arranged to be operated to gradually increase the flow of current through the said circuit, and actuating mechanism designed to automatically operate the secondary lever to increase the current strength upon the closing of the circuit by means of the primary lever, substantially as and for the purpose set forth.

5. An electric-current transmitting or circuit-closing apparatus, comprising, essentially, a primary circuit-closing lever, a secondary contact-lever, a solenoid for operating the secondary lever, and circuit-connections, substantially as set forth, whereby upon the closing of the circuit by the primary lever the secondary lever is automatically set in motion to gradually increase the strength or quantity of current flowing through the circuit.

6. In an electric-current transmitting apparatus, the combination, of a curved or elongated contact-surface forming one terminal of an electric circuit, a circuit-closing lever adapted to be moved to various points along said contact-surface and forming the other terminal of said circuit, intermediate devices, substantially such as shown, consisting of a secondary lever and a suitable actuating and speed-regulating mechanism, whereby when the circuit is closed by moving the circuit-closing lever the current flowing through the circuit is gradually increased in strength, and a segment-pawl or equivalent device to hold the circuit-closing lever in any desired position along the curved contact-surface, substantially as and for the purpose set forth.

7. In an electric-current transmitting apparatus, the combination of one or more series of contact points or surfaces, a contact arm or lever designed and adapted to come into electrical contact with said series of contact-points, an adjustable stop to limit the travel or sweep of said contact arm or lever, and a suitable speed governing or regulating device to control its rate of motion, substantially as and for the purposes set forth.

8. In an electric-current transmitting or circuit-closing apparatus, the combination, with the primary circuit-closing lever, the secondary switch-lever, and one or more series of contact-points, of a solenoid arranged to be energized by a portion of the current passing through the circuit-closing lever to move the switch-lever into successive contact with any desired number of said contact-points, and a governing or retarding device to control and render uniform the operation of said arm or lever, substantially as and for the purpose set forth.

9. In an electric-current transmitting or circuit-closing apparatus, the combination, with a series of contact-points, of an arm or lever designed to be operated to come into successive contact with said contact-points, and an adjustable governing or speed-regulating device whereby the sweep of the contact arm or lever over the series of contact-points is completed in a predetermined space of time.

10. In an electric-current transmitting or circuit closing apparatus, the combination, with the concentrically-arranged series of contact-points and the centrally-pivoted contact or switch lever, of a solenoid designed when energized to move said lever across said series of contact-points in one direction, a spring for moving the lever across said contact-points in an opposite direction, and a dash-pot having its piston provided with valved openings of unequal size and designed to govern and regulate the motion of the switch-lever, so that it will move in opposite directions at different rates of speed, substantially as and for the purpose set forth.

11. In an electric-current transmitting or circuit-closing apparatus, the combination of a normally-open working-circuit, a series of contact points or terminals arranged to be successively included in said circuit, a movable contact-arm normally in contact with the first contact-point of said series, a solenoid in a shunt or derived circuit, and means, substantially such as specified, whereby when the working-circuit is closed the solenoid is energized to automatically move the contact-arm from its position over the first contact-point into successive contact with other contact-points of the series, and thereby cause the working strength of the current in said working-circuit to be increased, substantially as and for the purpose specified.

12. In an electric-current transmitting or circuit-closing apparatus, the combination, with the transmitting or circuit-closing mechanism, of a number of exterior circuits or loops containing translating devices, and means, substantially as described, consisting of a suitable arrangement of terminal contacts and one or more supplementary switch-levers, by means of which any one of said exterior circuits or loops can be placed in circuit with the transmitting or circuit-closing apparatus, for the purpose set forth.

13. In an electric-current transmitting or circuit-closing apparatus, the combination, with the transmitting or circuit-closing mechanism, of a number of exterior working-circuits containing suitable translating devices, a supplementary switch-lever for connecting any of said exterior circuits with the transmitting apparatus, a circuit-closing lever in circuit with and forming part of the transmitting apparatus, and a separate cut-out switch for each of said exterior circuits, substantially as shown and described.

14. In an electric-current transmitting or regulating apparatus, the combination, with the centrally-pivoted contact-lever, and one or more series of contact-points, of the concentrically-arranged solenoid and regulating-cylinder and the curved or arc-shaped core and piston-rod attached to said lever, substantially as set forth.

15. In an electric-current transmitting or circuit-closing apparatus, the combination, with the solenoid and switch-lever, of a regulating-cylinder or dash-pot having a piston provided with valved openings of unequal size and opening in opposite directions, substantially as and for the purpose set forth.

16. In an electric-current transmitting or circuit-closing apparatus, the combination, with the inclosing-case having a rounded or curved top, of the interior contact points or surfaces arranged concentrically around a central shaft, the contact or switch lever movable about said shaft, the circuit-closing lever, also secured to the said shaft and provided with an exterior handle, a series of notches in the curved top of the inclosing-case, and a sector-pawl on the circuit-closing lever, adapted to enter said notches, substantially as and for the purpose set forth.

17. In an electric-current transmitting or circuit-closing apparatus, the combination of a circuit-closing lever provided with a segment-pawl, whereby it may be held in any desired position, a stop or projection on the circuit-closing lever, and a pivoted arm or lever designed to make successive electrical contact with a number of contact points or terminals, and arranged to come in contact with said stop or projection and have its motion arrested thereby, substantially as and for the purpose set forth.

18. In an electric-current transmitting or circuit-closing apparatus, the combination, with the inclosing-case, of the primary circuit-closing lever, the secondary contact-lever with its operative mechanism, and the supplementary switch-lever O, substantially as and for the purpose set forth.

19. In an electric-current transmitting or circuit-closing apparatus, the inclosing-case having a rounded or curved top, the concentrically-arranged series of contact points or surfaces, the centrally-pivoted contact or switch lever provided with a contact-surface at each extremity, the arc-shaped solenoid and dash-pot cylinder at opposite sides of the central pivot, the circuit-closing lever, and the sector-pawl on said lever, substantially as described, and for the purposes set forth.

ELIAS E. RIES.

Witnesses:
LEOPOLD RIES,
A. GROSS.